United States Patent
Collins

(10) Patent No.: US 9,773,130 B2
(45) Date of Patent: Sep. 26, 2017

(54) EMBEDDED GUARD-SANITIZER

(75) Inventor: James G. Collins, Palm Bay, FL (US)

(73) Assignee: NORTHROP GRUMMAN SYSTEMS CORPORATION, Los Angeles, CA (US)

( * ) Notice: Subject to any disclaimer, the term of this patent is extended or adjusted under 35 U.S.C. 154(b) by 854 days.

(21) Appl. No.: 12/778,247

(22) Filed: May 12, 2010

(65) Prior Publication Data

US 2011/0283143 A1    Nov. 17, 2011

(51) Int. Cl.

| | |
|---|---|
| G06F 7/04 | (2006.01) |
| G06F 12/00 | (2006.01) |
| G06F 12/14 | (2006.01) |
| G06F 13/00 | (2006.01) |
| G06F 17/30 | (2006.01) |
| G11C 7/00 | (2006.01) |
| G06F 21/85 | (2013.01) |
| G06F 21/62 | (2013.01) |
| G06F 21/71 | (2013.01) |
| G06F 21/60 | (2013.01) |

(52) U.S. Cl.
CPC .............. G06F 21/85 (2013.01); G06F 21/62 (2013.01); G06F 21/71 (2013.01); G06F 21/60 (2013.01)

(58) Field of Classification Search
CPC .... H04W 12/08; H04L 41/0893; G06F 21/60; G06F 21/62; G06F 21/70–21/72; G06F 21/74–21/76; G06F 21/78; G06F 21/82; G06F 21/85
USPC .......................................................... 726/17
See application file for complete search history.

(56) References Cited

U.S. PATENT DOCUMENTS

| | | | |
|---|---|---|---|
| 5,029,206 A * | 7/1991 | Marino, Jr. | ........... G06F 21/602 380/277 |
| 5,355,474 A | 10/1994 | Thuraisngham et al. | |
| 5,497,371 A | 3/1996 | Ellis et al. | |
| 5,960,080 A | 9/1999 | Fahlman et al. | |
| 6,678,822 B1 | 1/2004 | Morar et al. | |
| 6,754,819 B1 * | 6/2004 | Wootten | .............. G06F 21/6209 713/150 |
| 7,219,156 B1 * | 5/2007 | Brown | .................... G06F 11/30 709/226 |

(Continued)

*Primary Examiner* — Daniel Potratz
(74) *Attorney, Agent, or Firm* — Alan G. Towner Esq.; Leech Tishman Fuscaldo & Lampl

(57) ABSTRACT

An embedded guard-sanitizer apparatus is disclosed including a processor, a volatile, high-to-low working memory partition connected to the processor, and a volatile, low-to-high working memory partition connected to the processor. The embedded guard-sanitizer further includes a high-side, input/output section providing an interface to a high-side network or data bus, and configured to send messages to the high-to-low working memory, and to receive messages from the low-to-high working memory, and a low-side, input/output section providing an interface to a low-side network or data bus, and configured to send messages to the low-to-high working memory, and to receive messages from the high-to-low working memory. The embedded guard-sanitizer also includes a first non-volatile memory for storing a rule set binary image, whereby the processor controls the transfer of messages between the high-side input/output section and the low-side input/output section in accordance with the rule set, and a second non-volatile, memory for storing firmware for controlling executive functions of the apparatus.

20 Claims, 3 Drawing Sheets

(56) References Cited

U.S. PATENT DOCUMENTS

| | | | |
|---|---|---|---|
| 7,293,175 B2 | 11/2007 | Brown et al. | |
| 7,370,366 B2 | 5/2008 | Lacan et al. | |
| 7,475,242 B2 | 1/2009 | Baird et al. | |
| 7,526,620 B1 * | 4/2009 | McGovern | 711/159 |
| 7,962,702 B1 * | 6/2011 | Bean | G06F 21/79 |
| | | | 711/154 |
| 9,305,189 B2 * | 4/2016 | Mraz | G06F 21/85 |
| 2002/0129274 A1 * | 9/2002 | Baskey | G06F 9/544 |
| | | | 726/1 |
| 2004/0225883 A1 * | 11/2004 | Weller et al. | 713/166 |
| 2004/0230963 A1 * | 11/2004 | Rothman | G06F 8/65 |
| | | | 717/168 |
| 2005/0216726 A1 * | 9/2005 | Dellmo | G06F 21/602 |
| | | | 713/151 |
| 2006/0129848 A1 * | 6/2006 | Paksoy et al. | 713/193 |
| 2007/0282951 A1 * | 12/2007 | Selimis | H04L 67/06 |
| | | | 709/205 |
| 2008/0022353 A1 * | 1/2008 | Mayer et al. | 726/1 |
| 2008/0126799 A1 | 5/2008 | Winig | |

\* cited by examiner

EMBEDDED GUARD-SANITIZER

FIELD OF THE INVENTION

This invention relates to information processing systems and, more particularly, to an apparatus for transferring messages between a higher security environment and a lower security environment. Such devices are referred to as "guard sanitizers" or more generally as "cross domain solutions".

BACKGROUND OF THE INVENTION

The term "Multiple Independent Levels of Security" refers to a computer system architecture based on the concepts of information separation by security levels and controlled information flow between environments operating at the different security levels. The control of information flow between the different environments is carried out by devices referred to as "guard sanitizers" or "cross domain solutions" which perform inspection, redaction and blocking of messages sent between the environments according to a set of pre-defined rules. A 'message' in this context is a collection of digital data bits which may represent a message's contents, a message's origin and destination addresses and metadata about the message such as its length and parity. The environments on each side of a guard-sanitizer may each consist of computers and peripheral devices connected by a network such as Ethernet, MIL-STD-1553B, serial link, etc. Guard-sanitizers are themselves computer systems which contain rule sets used to examine each message sent from a system or peripheral in one security environment to a system or peripheral in the other. The rule set describes which messages can be passed between environments without alteration, which can be passed with specific alterations and which must be blocked. Guard-sanitizers with programmable rule sets have been available for several years but are generally designed to handle multiple users over multiple network connections of multiple types with very complex rule sets. Available systems are usually based on general purpose, secure operating system kernels such as variations of UNIX and provide very general capability. They may host the design of rule sets on the guard-sanitizers themselves. Their complexity makes security accreditation of such guard-sanitizers quite difficult and the resulting guard-sanitizer systems costly and time-consuming to implement in both non-recurring and recurring engineering.

In contrast, the invention described here (an embedded guard-sanitizer) answers the need for a special purpose apparatus for those applications which have a very specific and predictable structure of messages as in the communication of a high-security-level control system with a low-security-level peripheral device over a local network, or a weapon control system with an expendable weapon over a digital data network or link. Such a device should be simple, small, low power and embeddable wherever it is needed. Here the complexity and generality of previously developed guard-sanitizer solutions is not warranted.

SUMMARY OF THE INVENTION

In one aspect, the invention provides an apparatus including a processor; a volatile, high-to-low working memory partition connected to the processor; a volatile, low-to-high working memory partition connected to the processor; a high-side, input/output section providing an interface to a high-side network or data bus, and configured to send messages to the high-to-low working memory, and to receive messages from the low-to-high working memory; a low-side, input/output section providing an interface to a low-side network or data bus, and configured to send messages to the low-to-high working memory, and to receive messages from the high-to-low working memory; a first non-volatile memory for storing a binary rule set image, whereby the processor controls the transfer of messages between the high-side input/output section and the low-side input/output section in accordance with the rule set; and a second non-volatile, memory for storing firmware for controlling executive functions of the apparatus.

DETAILED DESCRIPTION OF THE INVENTION

Figure 1:
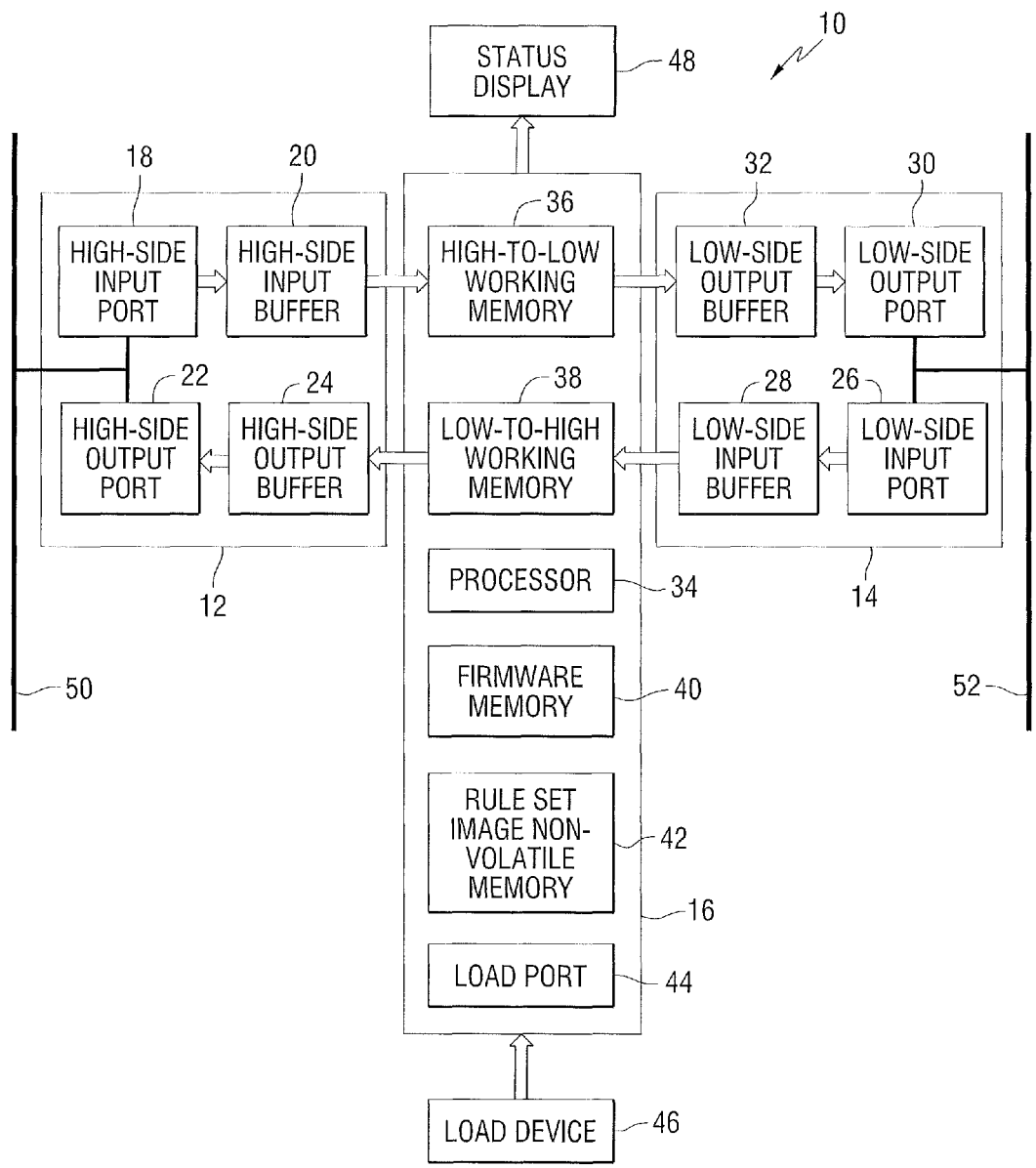
FIG. 1 is a block diagram of the embedded guard-sanitizer apparatus.

In one embodiment, the embedded guard-sanitizer invention includes a target module apparatus (hereafter called the target module) and a rule set image generator software application which runs on a separate, general-purpose computer. The target module is simple in architecture in order to be readily accredited by security accrediting authorities; small in size, weight, power and cooling requirements to be easily embedded in larger systems; inexpensive in order to be used in multiple, distinct networks and links where needed; tailorable to different environments by loading a customized rule set image; and robust against failures of its hardware or firmware in order to detect failures and prevent unauthorized and unintended transfer of messages.

The simplicity of the target module is made possible by implementing a particular embodiment of it to be embedded in a particular network or data bus, with a pair of network interfaces only for that network or data bus, and by tailoring its rule set for messages peculiar to that environment. For simplicity, the target module relies on the memory partitioning capabilities of the microprocessor hardware and data storage and error checking/correcting capabilities of solid state memories in lieu of complex software used by previously developed guard-sanitizers. The rule set is prepared with a generator software application on a separate, general purpose computer from operator inputs, checked for consistency, compiled into an executable image by the generator application, and transferred into non-volatile memory in the target module by means of a load device such as a flash memory card. This simplicity makes accreditation by security accrediting authorities easier since there are fewer features, operations and states to examine and accredit in any one embodiment of the invention than in previously developed guard-sanitizers. For other embodiments on the same type of network (e.g. Ethernet), only the rule set image would have to change; the hardware and the executive firmware would be identical.

To make the architecture simple, the target module implements a single high-side port and a single low-side port with the same type of network interface on both sides (e.g.

Ethernet, MIL-STD-1553B, serial, etc.). The status display reports results of the diagnostics of the target module hardware and firmware and the integrity of the loaded rule set image. Finally, a separate load port is provided through which the target module receives the rule set image. Internally, the separation of high-side and low-side networks is assured by the microprocessor and memory hardware of the system, by the executive firmware of the system that provides system diagnostics and critical services to the rule set image, and by the executable rule set image loaded into the hardware.

The target module always blocks message transfers between one network port and the other by default, and this condition must be overridden by the rule set image for messages to pass through the system. In the event of a failure of the hardware or a defective load of the rule set image, internal integrity checking by the executive firmware causes the device to fail "open" (i.e., messages are blocked), and the executive firmware writes an error message on the status display and sends a message to a host on the high-side to support built-in test functions of the larger system in which the target module is embedded.

The high-side port and the low-side port are clearly and permanently marked on the outside of the enclosure of the target module, and the enclosure can only be assembled one way. These features ensure that the ports are not inadvertently connected to networks of the wrong classification level.

The target module includes a small boot loader in ROM or PROM which boots the executive firmware when power is applied. This is part of the hardware and cannot be re-written. The executive firmware installed in the target module consists of binary, executable code appropriate to the microprocessor, which loads and executes rule set images, manages and protects memory partitions from overflow and reconfiguration, manages input and output operations on the network ports and their associated buffers, performs thorough diagnostic testing at startup, performs periodic diagnostics to ensure operational integrity, writes messages on the status display, and sends an error message to the high-side network in case of a failure. The executive firmware also exposes a simple application programming interface to the rule set image by which the rule set image can manipulate the input/output buffers and inspect and redact messages. The rule set image is binary executable code appropriate to the microprocessor. The rule set image is prepared with a generator software application on a general purpose computer. The input to the generator application is information about the structure and content of the messages to be exchanged without alteration, redacted or blocked. The rule set image cannot alter the executive firmware. Memories are sufficient for the executive firmware, for the largest rule set image, for the largest total required working memory and for the largest input and output message buffers which are needed for the high-side and low-side ports on the intended type of network.

Small size and simplicity minimize the weight, the power, and the cooling required to operate the target module. External connections are the high-side port, the low-side port, the load port and the power connector. A status display indicates error conditions and the operational status of the target module as discussed below. Memories for message buffers and working memory are volatile, and memories for the executive firmware and for the rule set image are non-volatile, programmable, read-only memory, which retain their contents over power cycles. The executive firmware performs integrity checking at power up and periodically while operating. The preceding characteristics suit the invention to applications in which the rule set changes infrequently and the target module does not require regular attention to perform its functions.

FIG. 1 is a top-level block diagram of the target module 10 constructed in accordance with one embodiment of the invention. The target module 10 includes a high-side input/output section 12, a low-side input/output section 14, and a processing section 16. The high-side input/output section 12 includes a high-side input port 18, a high-side input buffer 20, a high-side output port 22, and a high-side output buffer 24. The low-side input/output section 14 includes a low-side input port 26, a low-side input buffer 28, a low-side output port 30, and a low-side output buffer 32. The processing section 16 includes a processor 34, a high-to-low working memory 36, a low-to-high working memory 38, a firmware memory 40, and a rule set memory 42. A load port 44 is provided to allow loading of a rule set from a removable load device 46. A status display 48 displays the status of the target module. The target module is coupled to a high-side network 50 and a low-side network 52.

Figure 2:
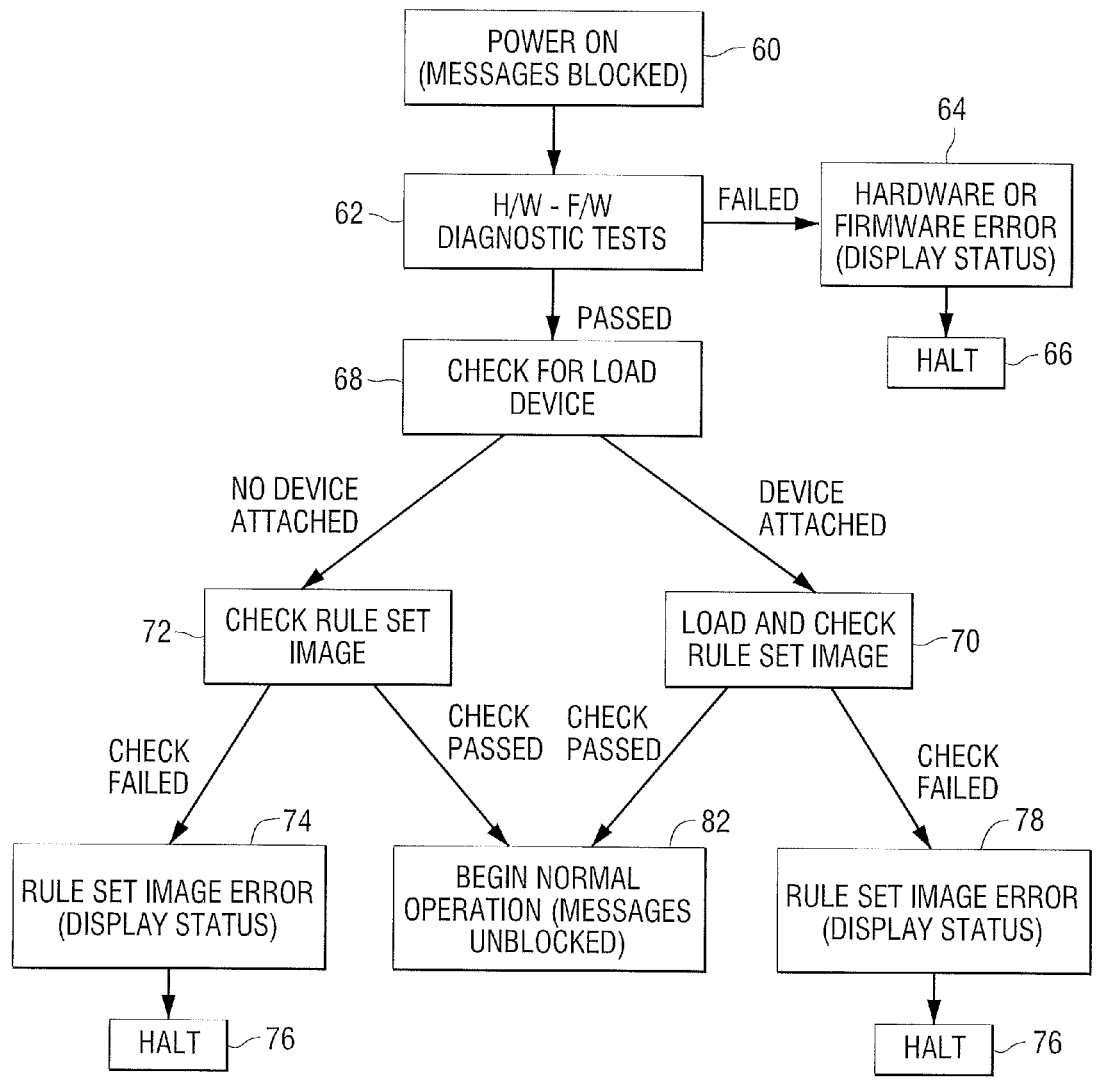
FIG. 2 is a flow diagram illustrating the start-up sequence of the apparatus showing validation steps.

One operating mode of the target module is startup and initialization (FIG. 2). When power is applied to the target module, it starts up in a state in which no messages can pass in either direction between high and low ports (block 60). It first runs a hardware diagnostic routine in its executive firmware to validate hardware integrity including all memory and the executive firmware image (block 62). The executive firmware is then checked by computing a checksum to compare against a master checksum for the executive firmware stored with the firmware at the time of its creation. If the executive's diagnostic finds a flaw in the hardware or firmware, it presents a message on its status display and on the high-side network (block 64) and continues to block any movement of messages between the high and low ports (block 66). If the diagnostic finds no flaw, it next checks if a load device is attached to the load port (block 68). If a load device is attached to the load port, the executive firmware copies the rule set image from the load device into its non-volatile memory (block 70). If no load device is detected, the executive firmware examines the non-volatile memory to see if a rule set image is already resident in memory (block 72). If executive firmware finds no rule set image already loaded and no load device attached, it presents an error message on the status display and the high-side port (block 74), halts operation (block 76), and continues to block all message transfers. If a rule set image is in memory, the executive firmware calculates a checksum of the image and compares the checksum with a checksum value stored with the rule set image at the time of its creation by the rule set image generator application. If it finds a flaw in the stored rule set image, it presents an error message on the status display and the high-side port (block 78), halts operation (block 76), and continues to block all message transfers. If no error in the rule set image is found, the executive firmware presents a "ready" message on the status display and starts to execute the evaluation and selective transfer of messages between the high-side and low-side networks (block 82).

In another operating mode, the target module has three possible actions for high-side to low-side message transfers:
  (a) pass a message from the high-side to the low-side without modification,
  (b) selectively redact and substitute portions of the message before passing the message from the high-side to the low-side, or
  (c) block the message.

Figure 3:
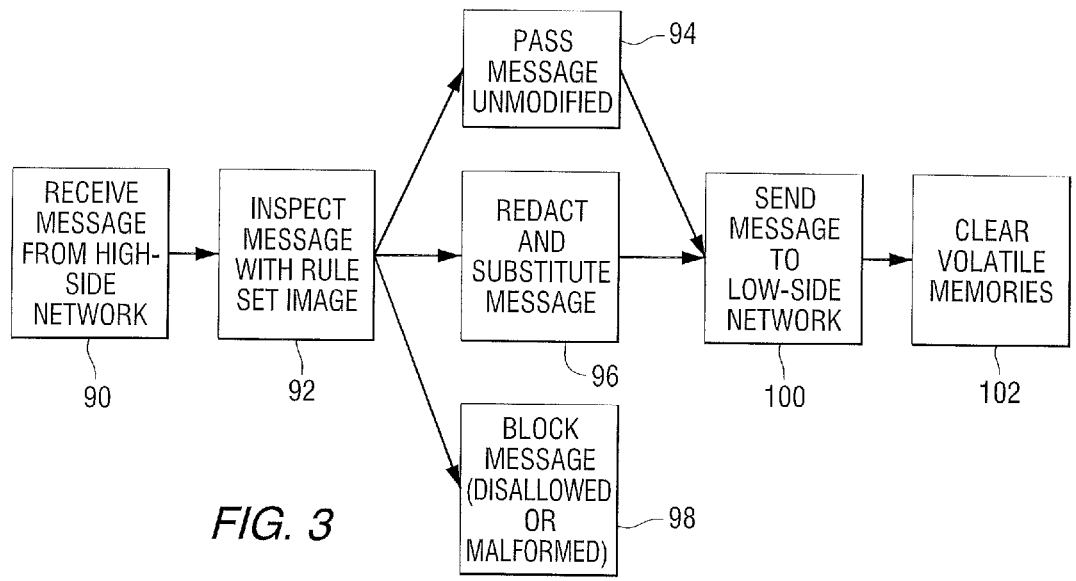
FIG. 3 is a flow diagram illustrating the high-side to low-side processing sequence.

The high-to-low processing flow is shown in FIG. 3. First a message is received from the high-side network (block 90). The message is inspected using the rule set image (block 92). Based on that inspection, the target module can pass the message unmodified (block 94), redact or substitute the message (block 96), or block the message (block 98). If the message is to be passed unmodified, or redacted, it is sent to the low-side network (block 100), and the volatile memories are cleared (block 102). If the addresses or contents are not allowed on the low side, then the target module blocks the transfer and may, based on the rule set, present a failure status message on the high-side port. If a message is selectively allowed or blocked, then the rule set image changes addresses or message contents as specified in the rule set to sanitize the message for release to the low side. For each action resulting in a message pass-through, the target module examines the message for parity errors and other malformations and takes action as dictated by the rule set. It also recalculates the byte count and parity. Depending on the rule set, the target module may adjust the timing of the presentation of the message on the low-side port to prevent covert channel signaling. The rule set also implements how return status messages are handled. Finally, the volatile, working memory areas used by the target module for the message evaluation, redaction and substitution are overwritten so that it is ready to be re-used for the next message. If the rule set deteimines that a response to the message is to be expected, it may direct that information about the current high-to-low message be retained in volatile memory to support evaluation of a low-to-high response message.

Figure 4:
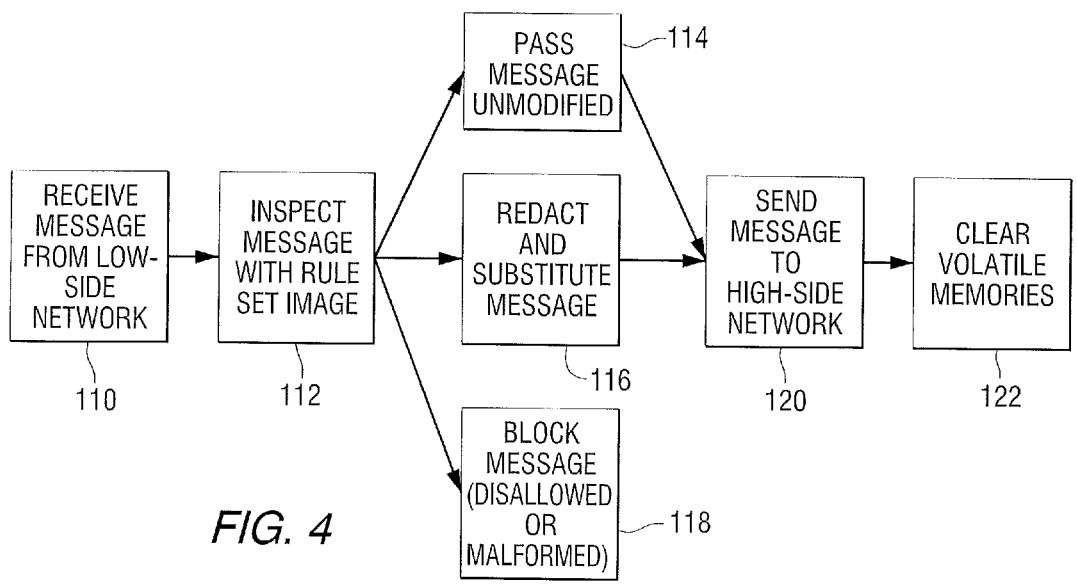
FIG. 4 is a flow diagram illustrating the low-side to high-side processing sequence.

In another operating mode, the target module also handles low-side to high-side messages as it handles high-side to low-side messages. The low-to-high processing flow is shown in FIG. 4. First a message is received from the low-side network (block 110). The message is inspected using the rule set image (block 112). Based on that inspection, the target module can pass the message unmodified (block 114), redact and substitute the message (block 116), or block the message (block 118). If the message is to be passed unmodified, or redacted, it is sent to the high-side network (block 120) and the volatile memories are cleared (block 122).

As in the high-side to low-side case, the target module may transfer a message without modification, redact and substitute message addresses or contents, or block the message altogether as required by the rule set. Before the target module transfers the message, the rule set image examines the message to ensure that it is correctly formed and free of parity errors. The rule set image may block malformed messages or redact and substitute addresses or contents as in the high-side to low-side mode. If a response was expected after a previous high-side to low-side message, the rule set image evaluates whether a received response message is appropriate for the preceding command message. The low-side to high-side processing flow is shown in FIG. 4 and is very similar to the high-to-low transfer. The rule set dictates the action to be taken based upon message content.

In another operating mode, the target module may be fully sanitized by sending it a "sanitize" command from an external source on the high-side network. When it receives the sanitize command, the target module performs a hardware validation and then performs multiple overwrite operations on the non-volatile memories used by the rule set image in accordance with government standards and overwrites all the volatile memory areas. If the target module cannot complete these steps, it writes a "sanitize failed" message on its display; otherwise, it writes a "sanitized" message on its display. Recovery from a sanitize command is by reloading the rule set image from the external load device. The executive firmware is not affected by this operation since it can be reloaded only by opening the target module to expose a protected firmware load port and enabling overwrite by means of a switch. The rule set image is included because it may contain sensitive information about the message structure, content and addresses used in a particular embodiment.

Isolation of high-side and low-side networks is realized by a strong dependence on the memory architecture of the target module's hardware and intentional movement of messages from an area of memory dedicated to one level to a dedicated working area for inspection and sanitization by the rule set and then on to an area dedicated to the other level. Apart from the operation of the rule set, the invention blocks all transfers of messages from low side to high side and from high side to low side by default. Since formal action by the rule set is required to transfer messages from the input port to the output port via the dedicated working memory areas, no messages can accidentally move or "leak" from one port to the other. The block-by-default design, thorough startup diagnostics and periodic diagnostic tests during operation ensure that a hardware or firmware failure does not compromise the target module's operational integrity.

In one embodiment, the apparatus includes a processor, a volatile, high-to-low working memory partition connected to the processor, a volatile, low-to-high working memory partition connected to the processor, a high-side, input/output section, a low-side, input/output section, a first non-volatile memory for storing a binary rule set image, a second non-volatile memory for storing the executive firmware, an alphanumeric status display unit, a load port, and permanent markings on the target module's enclosure indicating "high side" and "low side" connections.

The processor maintains rigorously bounded partitions in memory by means of its hardware rather than by means of operating system or application software structures alone. For example, the processor may employ memory partitioning that includes definable memory "segments" or partitions as part of their processor architecture. Once set up, these partitions limit the range of memory in which the processor is working until a specific operation is executed to reset to another partition. This makes the executive firmware less complex. Using processor-controlled memory partitions contributes to a simpler software architecture suitable for an embedded device. The volatile, high-to-low working memory partition and the volatile, low-to-high working memory partition have inherent error checking and correcting capability. The embodiment of FIG. 1 uses the processor's hardware memory partitioning capability to maintain separate high-to-low and low-to-high working memory partitions.

The high-side, input/output section provides an interface to the high-side network or data bus, a volatile memory input message buffer, a volatile memory output message buffer and a separate interface to the microprocessor and its working memory configured to send messages to the high-to-low working memory, and to receive messages from the low-to-high working memory.

The low-side, input/output section provides an interface to the low-side network or data bus, a volatile memory input message buffer, a volatile memory output message buffer and a separate interface to the microprocessor and its working memory configured to send messages to the low-to-high working memory, and to receive messages from the high-to-low working memory.

The first non-volatile memory stores a binary rule set image, whereby the processor controls the transfer of messages between the high-side input/output section and the low-side input/output section in accordance with the rule set.

The second non-volatile memory stores the executive firmware of the target module which provides basic executive services, input/output services, startup diagnostics, operational diagnostics, and a run-time environment for the rule-set image.

The alphanumeric status display shows the operational status of the guard sanitizer. The load port is used to input the rule set image from an external, non-volatile memory device such as a flash memory card. The permanent markings on the target module's enclosure indicate "high side" and "low side" connections for the respective networks to prevent inadvertent misconnection.

The processor and executive firmware block message transfers between high-side and low-side ports by default, a condition which must be intentionally overridden by the rule-set image. The executive firmware provides an executive program not writable or modifiable by the processor except by use of a special, protected load port. The processor controls the transfer of messages between the high-side input/output circuit and the low-side input/output circuit by passing the messages unmodified, redacting or substituting the messages, or blocking the messages under control of the rule set image. The processor can also perform a hardware and firmware diagnostic test after start-up (i.e., the application of electrical power); perform periodic hardware and firmware diagnostic tests during normal operations to ensure integrity; and/or perform periodic checks on the validity of the rule set image. The executive firmware writes status messages to a display on the apparatus and optionally sends a status message on the high-side network in support of built-in test capability of a system in which the target module is embedded.

A rule set image can be produced on a separate, general purpose computer by a rule set image generator software application and compiled into the form of a binary image to be executed by the processor on the target module and which dictates how particular messages are passed unaltered, redacted or blocked by the guard sanitizer.

A device referred to as an embedded guard-sanitizer (EGS) has been described which includes a processor, a high-to-low working memory coupled to the processor, a low-to-high working memory connected to the processor, a high-side input/output circuit configured to transfer messages to the high-to-low working memory, and to receive messages from the low-to-high working memory, a low-side input/output circuit configured to transfer messages to the low-to-high working memory, and to receive messages from the high-to-low working memory, and a rule set memory for storing a rule set, wherein the processor controls the transfer of messages between the high-side input/output circuit and the low-side input/output circuit in accordance with the rule set. The described invention is a simple, low cost, off-line programmable and readily accredited guard sanitizer with a simple, rigidly structured message set, to be used between environments with differing security requirements without the size, weight, power, recurring cost or difficulty in accreditation characteristic of previously developed guard sanitizers. It is envisioned that this would be used between a processing system and a peripheral device or between a weapon control system and an expendable weapon over a single type of network connection such as Ethernet, MIL-STD-1553B, serial, etc.

While the invention has been described in terms of several embodiments, it will be apparent to those skilled in the art that various changes can be made to the described embodiments without departing from the scope of the invention as set forth in the following claims.

What is claimed is:

1. An apparatus configured to be embedded in a bus between networks or data buses, wherein at least two of the networks or data buses operate at different security levels, the apparatus comprising:
   a single dedicated processor;
   a volatile, high-to-low working memory partition connected to the single dedicated processor;
   a volatile, low-to-high working memory partition connected to the processor; the high-to-low and low-to-high working memory partitions configured by the processor to limit the range of memory in which the processor is working until a specific operation is executed to reset to another partition;
   a high-side, input/output section providing an interface to a high-side network or data bus, and configured to send messages to the high-to-low working memory partition, and to receive messages from the low-to-high working memory partition;
   a low-side, input/output section providing an interface to a low-side network or data bus, and configured to send messages to the low-to-high working memory partition, and to receive messages from the high-to-low working memory partition;
   a first non-volatile memory for storing a binary rule set image, whereby the processor controls the transfer of messages between the high-side input/output section and the low-side input/output section in accordance with the rule set; and
   a second non-volatile, memory for storing firmware for controlling executive functions of the apparatus;
   wherein messages received from the high-side network or data bus are inspected using the rule set and based on that inspection, the apparatus passes the message to the low side network or data bus unmodified, redacts or substitutes the message prior to passing the message to the low side network or data bus, or blocks the message; and
   wherein messages received from the low-side network or data bus are inspected using the rule set and based on that inspection, the apparatus passes the message to the high side network or data bus unmodified, redacts or substitutes the message prior to passing the message to the high side network or data bus, or blocks the message.

2. The apparatus of claim 1, wherein:
   the high-side, input/output section includes a volatile high-side memory input message buffer, a volatile high-side memory output message buffer and a high-side interface configured to send messages to the high-to-low working memory, and to receive messages from the low-to-high working memory; and
   the low-side, input/output section includes a volatile low-side memory input message buffer, a volatile low-side memory output message buffer and a low-side interface to the microprocessor and its working memory configured to send messages to the low-to-high working memory, and to receive messages from the high-to-low working memory.

3. The apparatus of claim 1, wherein:
the firmware provides executive services, input/output services, startup diagnostics, operational diagnostics, and a run-time environment for the rule-set image.

4. The apparatus of claim 1, further comprising:
an alphanumeric status display unit to show the operational status of the apparatus.

5. The apparatus of claim 1, further comprising:
a load port to input the rule set image from an external, non-volatile memory device.

6. The apparatus of claim 1, further comprising:
permanent markings indicating "high side" and "low side" connections for the networks or data buses to prevent inadvertent misconnection.

7. The apparatus of claim 1, wherein the single processor and firmware block message transfers between high-side and low-side networks of data buses by default.

8. The apparatus of claim 1, wherein the firmware provides an executive program not writable or modifiable by the single processor except by use of a special, protected load port.

9. The apparatus of claim 1, wherein the single processor performs a hardware and firmware diagnostic test after start-up.

10. The apparatus of claim 1, wherein the single processor performs periodic hardware and firmware diagnostic tests during normal operations.

11. The apparatus of claim 1, wherein the processor periodically checks the validity of the rule set image.

12. The apparatus of claim 1, wherein the firmware writes status messages to an alphanumeric display and optionally sends a status message on the high-side network in support of built-in test capability of a system in which the apparatus is embedded.

13. The apparatus of claim 1, wherein the rule set image produced on a separate, general purpose computer by a rule set image generator software application and compiled into the form of a binary executable image to be executed by the single processor.

14. The apparatus of claim 1, wherein the apparatus uses the single processor's hardware memory partitioning capability to maintain separate high-to-low and low-to-high working memory partitions.

15. The apparatus of claim 1, wherein the single processor is configured to perform a hardware validation, and then perform multiple overwrite operations on the non-volatile memories and overwrite all the volatile memory areas in response to a sanitize command.

16. An apparatus configured to be embedded in a bus between networks or data buses, wherein at least two of the networks or data buses operate at different security levels, the apparatus comprising:
a single dedicated processor;
a volatile, high-to-low working memory partition connected to a single dedicated processor;
a volatile, low-to-high working memory partition connected to the processor; the high-to-low and low-to-high working memory partitions configured by the processor to limit the range of memory in which the processor is working until a specific operation is executed to reset to another partition;
a high-side, input/output section providing an interface to a high-side network or data bus, and configured to send messages to the high-to-low working memory partition, and to receive messages from the low-to-high working memory partition;
a low-side, input/output section providing an interface to a low-side network or data bus, and configured to send messages to the low-to-high working memory partition, and to receive messages from the high-to-low working memory partition;
a first non-volatile memory for storing a binary rule set image, whereby the processor controls the transfer of messages between the high-side input/output section and the low-side input/output section in accordance with the rule set; and
a second non-volatile, memory for storing firmware for controlling executive functions of the apparatus;
wherein messages received from the high-side network or data bus are inspected using the rule set and based on that inspection, the apparatus redacts or substitutes the message prior to passing the message to the low side network or data bus; and
wherein messages received from the low-side network or data bus are inspected using the rule set and based on that inspection, the apparatus redacts or substitutes the message prior to passing the message to the high side network or data bus.

17. The apparatus of claim 16, wherein:
the high-side, input/output section includes a volatile high-side memory input message buffer, a volatile high-side memory output message buffer and a high-side interface configured to send messages to the high-to-low working memory, and to receive messages from the low-to-high working memory; and
the low-side, input/output section includes a volatile low-side memory input message buffer, a volatile low-side memory output message buffer and a low-side interface to the microprocessor and its working memory configured to send messages to the low-to-high working memory, and to receive messages from the high-to-low working memory.

18. The apparatus of claim 16, wherein the firmware writes status messages to an alphanumeric display and optionally sends a status message on the high-side network in support of built-in test capability of a system in which the apparatus is embedded.

19. The apparatus of claim 16, wherein the apparatus uses the single processor's hardware memory partitioning capability to maintain separate high-to-low and low-to-high working memory partitions.

20. The apparatus of claim 16, wherein the single processor is configured to perform a hardware validation, and then perform multiple overwrite operations on the non-volatile memories and overwrite all the volatile memory areas in response to a sanitize command.

* * * * *